United States Patent [19]

Rath

[11] 4,039,054
[45] Aug. 2, 1977

[54] DISC BRAKES FOR VEHICLES

[75] Inventor: Heinrich Bernhard Rath, Vallendar (Rhine), Germany

[73] Assignee: Girling Limited, Birmingham, England

[21] Appl. No.: 641,231

[22] Filed: Dec. 18, 1975

[30] Foreign Application Priority Data

Dec. 19, 1974  United Kingdom ............... 55057/74

[51] Int. Cl.² .......................................... F16D 55/224
[52] U.S. Cl. ................................................ 188/73.4
[58] Field of Search ................... 188/72.1, 72.2, 73.1, 188/73.3–73.6

[56] References Cited

U.S. PATENT DOCUMENTS 3,166,158   1/1965   Burnett et al. ....................... 188/73.4

Primary Examiner—Duane A. Reger
Attorney, Agent, or Firm—Scrivener, Parker, Scrivener and Clarke

[57] ABSTRACT

In a disc brake of the sliding yoke reaction type a friction pad assembly adapted to be applied directly to a rotatable disc by actuating means is provided at opposite ends with lugs which engage over spaced arms in a stationary member so that, when the brake is applied, the drag on the pad assembly is taken by the arm at the end of the brake with which any point on the disc first comes into alignment for a given direction of disc rotation.

5 Claims, 3 Drawing Figures

DISC BRAKES FOR VEHICLES

SPECIFIC DESCRIPTION This invention relates to disc brake for vehicles of the kind in which a directly actuated friction pad assembly is adapted to be applied to one face of a rotatable disc by actuating means, and a stationary member is provided with a pair of circumferentially spaced arms which extend towards the disc and on which a yoke extending over the peripheral edge of the disc is guided for sliding movement in a direction generally parallel to the axis of the disc, a second friction pad assembly being adapted to be urged into engagement with the opposite face of the disc by means of the yoke.

In one known type of disc brake of the kind set forth for vehicles the directly actuated friction pad assembly is slidably guided between the arms for movement towards and away from the disc and, when the brake is applied, the directly actuated pad assembly tends to move angularly with the disc and is urged against the arm which is located at the rear end of the pad assembly and which defines an abutment for taking the drag on that pad assembly. The pad assembly then tends to swing in towards the disc swinging about the rear end of the pad assembly as a fulcrum, and the pad assembly behaves in a similar manner to that of a leading shoe in an internal shoe-drum brake. It is believed that this effect may be the cause of "brake squeal" which is sometimes produced when the brake is applied. Furthermore, as the material of the directly actuated friction pad assembly wears, the worn away material in the form of dust or powder, and dirt and other substances cleaned off the disc as the brake is applied, collects in gaps between the pad assembly and the arms. Since the areas defined by the gaps are enclosed, it is unlikely that such debris and the heat generated in a brake application will be carried away by cooling air. Due to the effect of heat the debris can form a sintered compact which will oppose brake application by impeding movement of the directly actuated friction pad assembly towards the disc.

Also in this known type of disc brake two machining operations in directions at right angles are required in the stationary member namely, in a direction normal to the axis of the disc to define internal guiding surfaces on the arms for the directly actuated friction pad assembly and in a direction parallel to the axis of the disc to define external guiding surfaces on the arms on which the yoke is guided for sliding movement.

According to our invention, in a disc brake of the kind set forth for vehicles, the directly actuated friction pad assembly is provided at opposite ends with lugs which engage over the arms and by means of which the pad assembly is guided for movement towards and away from the disc whereby, when the brake is applied, the drag on the pad assembly is taken by the arm at the end of the brake with which any point on the disc first comes into alignment for a given direction of disc rotation.

The lugs extend inwardly from extensions projecting circumferentially from end edges of the directly actuated pad assembly to engage with outer faces of the arms, the said end edges being spaced from the inner faces of the arms.

Thus, when the brake is applied, the directly actuated friction pad assembly behaves in a similar manner to a trailing shoe in an internal shoe drum brake with the result that the tendency for the brake to squeal is eliminated substantially or greatly reduced. Furthermore, the drag-taking guiding surfaces for the directly actuated pad assembly comprise the circumferentially outer ends of the arms which are not displaced from the area affected by debris. The manufacture of the brake is facilitated since guide surfaces on the arms on which the pad assembly is guided can be machined simultaneously and in a single machining operation, conveniently by broaching, with the machining of the arms to produce external guiding surfaces on which the yoke is slidably guided, both pairs of guiding surfaces lying in the same direction.

Preferably substantial clearances are provided between the circumferentially opposite inner ends of the arms and the friction pad assembly to preclude substantially the build-up of debris therebetween.

One embodiment of our invention is illustrated in the accompanying drawings in which.

Figure 3:
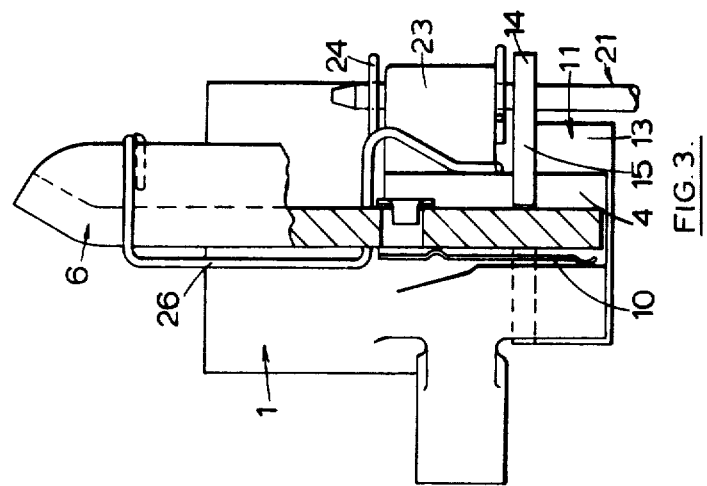
FIG. 3 is a longitudinal section through a part of the brake on the line 3—3 of FIG. 1.
Figure 1:
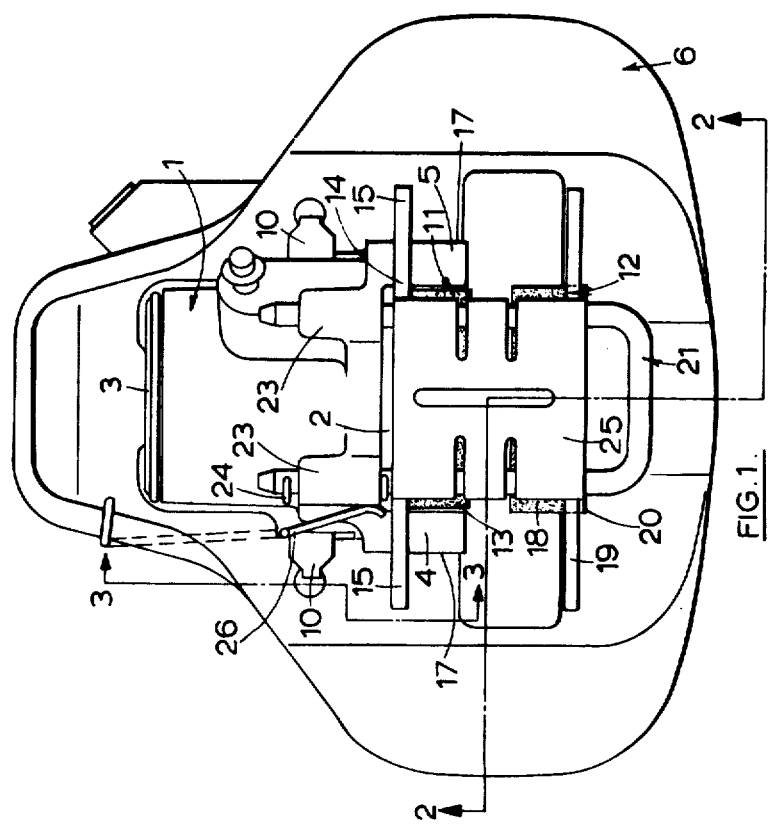
FIG. 1 is a plan view of an hydraulically-operated disc brake for vehicles.
Figure 2:
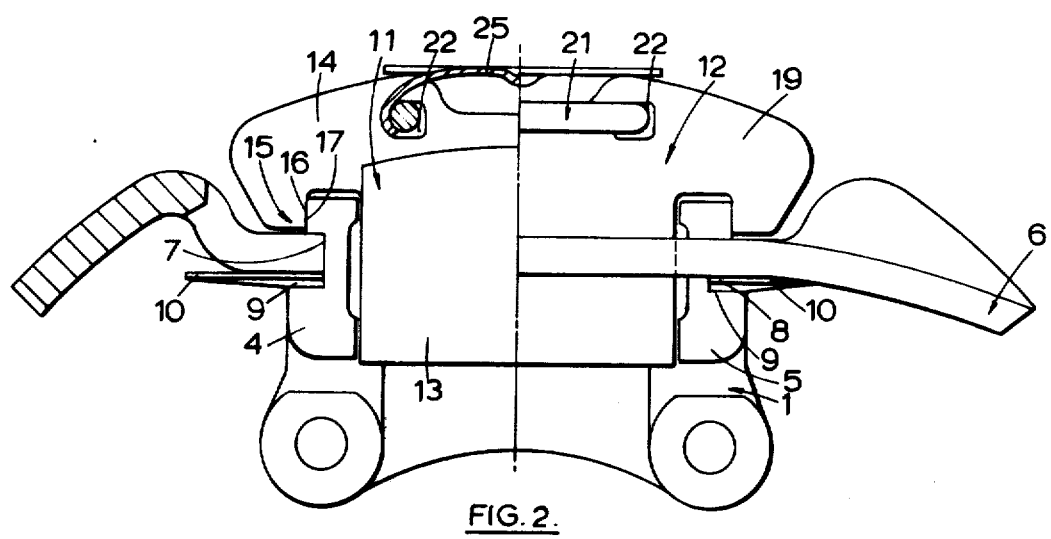
FIG. 2 is a part end elevation including a section on the line 2—2 of FIG. 1.

In the disc brake illustrated in the drawings a stationary drag-taking housing 1 in the form of a casting or forging is mounted on a part of the frame of the vehicle adjacent to one face of a rotatable disc (not shown). The housing 1 is provided with an open-ended longitudinally extending axial bore defining an hydraulic cylinder in which works a pair of opposed hydraulic pistons 2 and 3. A pair of circumferentially spaced parallel-sided arms 4 and 5 which project forwardly from the forward end of the housing are disposed within the periphery of the disc and terminate short of the disc at their free ends.

A yoke 6 comprising a one-piece metal pressing is provided with an opening of generally T outline to accommodate the housing 1 and the peripheral edge of the disc. Spaced parallel side edge portions 7 and 8 on opposite sides of the yoke are slidably received and guided in axially extending grooves 9 in the circumferentially outermost end faces of the arms 4, 5, and the yoke 6 is urged into engagement with the radially outermost ends of the grooves 9 by means of blade springs 10.

Friction pad assemblies 11 and 12 are located on opposite sides of the disc. A major portion of the directly actuated friction pad assembly 11 extends inwardly between the arms 4 and 5 in a radial direction and comprises a friction pad 13 carried by a rigid backing plate 14. The backing plate 14 is provided with lugs 15 which fit over the arms 4 and 5. The lugs 15 extend radially inwards from circumferential extensions of the backing plate 14 with which they form hook-like formations. Inner parallel faces 16 of the lugs 15 engage slidably with flat portions 17 of the arms 4 and 5 above the grooves 9 and which define drag-taking guiding surfaces for the pad assembly 11. Substantial clearances are provided between the end edges of the pad assembly 11, from which the extensions project, and the inner faces of the arms 4, 5.

The second or indirectly actuated friction pad assembly 12 also comprises a friction pad 18 carried by a rigid backing plate 19, and the backing plate 19 is provided at its inner ends with hook-like lugs. The indirectly actuated friction pad assembly 12 is mounted in a groove 20 formed in the edge of the opening in the yoke 6.

The friction pad assemblies 11 and 12 are retained against movement in a radially outwards direction by means of a removable pin assembly 21 of generally U outline which extends over the peripheral edge of the disc and through clearance openings 22 in both backing plates 14 and 19. The free ends of the limbs of the assembly 21 are received in parallel bores in radial lugs 23 the housing 1 in which they are detachably retained by a spring retainer 14. An anti-rattle plate spring assembly 25 acts between the pin assembly 21 and the pad assemblies 11 and 12.

The pistons 2 and 3 act in opposite directions between the directly actuated friction pad assembly 11 and the yoke 6 so that, when the hydraulic cylinder is pressurised, the directly actuated friction pad assembly 11 is applied directly to an adjacent face of the disc and the friction pad assembly 12 is urged into engagement with the opposite face of the disc by the operation of the piston 3 which causes the yoke 6 to slide in an axial direction with respect to the disc.

When the brake is applied with the disc rotating in an anti-clockwise direction with reference to the drawings, the pad assemblies 11 and 12 tend to move circumferentially with the disc with the result that the drag on the directly actuated friction pad assembly 11 is transmitted directly to the trailing arm 5 through the faces 16 and 17, and the drag on the pad assembly 12 is taken by an edge of the groove from whence it is transferred through the yoke 6 to the arm 5.

When the pad assemblies 11 and 12 are new, the drag on the directly actuated pad assembly 11 is transmitted to the arm 5 at a contact point disposed at the end of the arm 5 which is remote from the disc, while the drag from the indirectly actuated friction pad assembly 12 is transmitted to the same arm 5 through the yoke 6 at a contact point which is adjacent to the opposite inner end of the arm 5 due to the tendency for yoke 6 to twist, at least slightly, during a brake application. As the material of the friction pads 13 and 18 wears, the said contact points will move towards each other and then cross over. If the material of the pads 13 and 18 wears at the same rate the bending moment on the arm 5, which is effectively a cantilever beam, remains constant for the same drag loads during the life of the pads.

By arranging for the drag on the friction pad assembly 11 to be taken by a trailing abutment helps to eliminate "brake squeal" and brake seizure and by maintaining the bending moment on the trailing arm at a substantially constant value throughout the wear life of the pads 13 and 18 enables us to ensure that the arms are not damaged in service by the bending moment.

To eliminate rattle when the brake is in an "off" position, and to ensure that brake application is achieved with a minimum of noise, at least when the disc is rotating in a normal forward direction, a spring 26 acts between the yoke 6 and the housing 1 to urge the yoke 6 into engagement with the base of the groove 9 in the arm 5.

I claim:

1. A disc brake for a vehicle comprising a rotatable disc, a stationary member located on one side of said disc, a yoke extending over the peripheral edge of the disc, circumferentially spaced arms provided in said stationary member and on which said yoke is guided for sliding movement in a direction generally parallel to the axis of said disc, said arms having spaced inner faces and external guiding and drag-taking surfaces, first directly actuated friction pad assembly for engagement with one face of said disc located between said arms and spaced from said inner faces of said arms, a second indirectly actuated friction pad assembly for engagement with the opposite face of said disc, hook-like lugs at opposite ends of said first friction pad assembly engaging over said arms, and having inner faces which engage slidably with said guiding surfaces to guide said first friction pad assembly for movement in said stationary member towards and away from said disc and to transmit drag to said arms from said first friction pad assembly when the brake is applied, the drag on said first friction pad assembly being transmitted to said guiding and drag-taking surface at the one of the said arms which is positioned at the end of the brake with which any point on said disc first comes into alignment for a given direction of rotation of said disc, the drag being transmitted to the said guiding and drag-taking surface from said inner face of said lug which engages with the said one arm, and actuating means for applying said first friction pad assembly directly to said disc with the reaction thereof acting through said yoke to apply said second friction pad to said disc.

2. A disc brake as claimed in claim 1, wherein said lugs extend inwardly from extensions projecting circumferentially from end edges of said directly actuated pad assembly to engage with outer faces of said arms, the said end edges being spaced from said inner faces of said arms.

3. A disc brake as claimed in claim 1, wherein said inner edges of said lugs which are parallel engage with parallel external guiding surfaces on said arms.

4. A disc brake as claimed in claim 3, wherein said external guiding surfaces of said arms are parallel with said inner faces of said arms from which said end edges of the directly actuated friction pad assembly are spaced.

5. A disc brake as claimed in claim 1, wherein said directly actuated friction pad assembly comprises a rigid backing plate, and a pad of friction material carried by said rigid backing plate, and said lugs are provided in said backing plate.

* * * * *